(12) United States Patent
Bailey et al.

(10) Patent No.: US 10,408,227 B2
(45) Date of Patent: Sep. 10, 2019

(54) AIRFOIL WITH STRESS-REDUCING FILLET ADAPTED FOR USE IN A GAS TURBINE ENGINE

(71) Applicant: Rolls-Royce Corporation, Indianapolis, IN (US)

(72) Inventors: Patrick E. Bailey, Zionsville, IN (US); Timothy Unton, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 228 days.

(21) Appl. No.: 15/209,236

(22) Filed: Jul. 13, 2016

(65) Prior Publication Data
US 2018/0017075 A1   Jan. 18, 2018

(51) Int. Cl.
*F02C 3/04* (2006.01)
*F04D 29/54* (2006.01)
*F02K 3/06* (2006.01)
*F01D 9/04* (2006.01)

(52) U.S. Cl.
CPC ............ *F04D 29/542* (2013.01); *F01D 9/041* (2013.01); *F02C 3/04* (2013.01); *F02K 3/06* (2013.01); *F04D 29/547* (2013.01); *F05D 2230/232* (2013.01); *F05D 2240/121* (2013.01); *F05D 2240/122* (2013.01); *F05D 2250/71* (2013.01); *F05D 2270/114* (2013.01); *Y02T 50/672* (2013.01); *Y02T 50/673* (2013.01)

(58) Field of Classification Search
CPC ... F01D 9/041; F02C 3/04; F02K 3/06; F04D 29/542; F04D 29/547; F05D 2230/232; F05D 2240/121; F05D 2240/122; F05D 2250/71; F05D 2270/114
See application file for complete search history.

(56) References Cited

U.S. PATENT DOCUMENTS

| | | | |
|---|---|---|---|
| 6,969,232 B2* | 11/2005 | Zess | F01D 5/145 415/191 |
| 7,189,064 B2* | 3/2007 | Helder | B23K 20/122 416/232 |
| 7,371,046 B2* | 5/2008 | Lee | F01D 5/143 415/191 |
| 8,206,095 B2* | 6/2012 | Parker | F01D 5/14 415/191 |
| 8,707,712 B2 | 4/2014 | Spangler et al. | |
| 8,715,809 B2 | 5/2014 | Ravey | |
| 8,998,575 B2* | 4/2015 | Lucashu | F01D 9/04 415/190 |
| 9,920,633 B2* | 3/2018 | Bergman | F01D 9/041 |
| 9,982,548 B2* | 5/2018 | Ols | F01D 5/143 |
| 2011/0081238 A1* | 4/2011 | Durocher | F01D 9/02 415/200 |
| 2014/0212260 A1* | 7/2014 | Xu | F01D 9/041 415/1 |
| 2014/0212292 A1* | 7/2014 | Xu | F01D 5/30 416/193 A |
| 2014/0363276 A1* | 12/2014 | Vetters | F02K 3/04 415/124.2 |

(Continued)

*Primary Examiner* — Jesse S Bogue
(74) *Attorney, Agent, or Firm* — Barnes & Thornburg LLP

(57) ABSTRACT

The present disclosure is directed toward airfoils used in gas turbine engines. More specifically, the present disclosure teaches airfoils with fillets for managing stresses in airfoils during use in gas turbine engines.

4 Claims, 3 Drawing Sheets

(56) References Cited

U.S. PATENT DOCUMENTS

| | | | |
|---|---|---|---|
| 2015/0308451 A1* | 10/2015 | Baer | F04D 29/388 |
| | | | 416/232 |
| 2016/0003048 A1* | 1/2016 | Gray | F01D 5/141 |
| | | | 60/805 |
| 2016/0003070 A1* | 1/2016 | Kastel | F01D 5/147 |
| | | | 60/805 |
| 2016/0017731 A1* | 1/2016 | Becker | B23P 15/00 |
| | | | 415/208.4 |
| 2016/0123166 A1* | 5/2016 | Ols | F01D 5/143 |
| | | | 415/210.1 |
| 2016/0265551 A1* | 9/2016 | Bailey | F01D 9/041 |
| 2017/0009587 A1* | 1/2017 | Szymanski | F01D 5/141 |

* cited by examiner

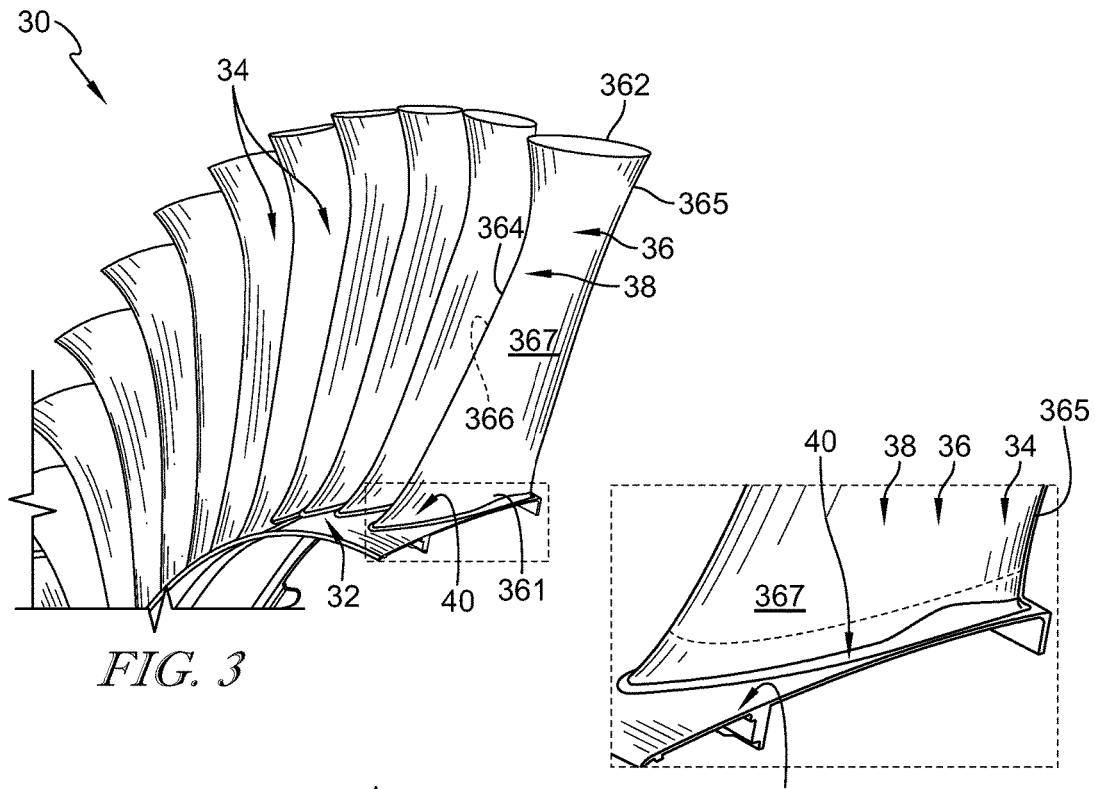
FIG. 3
FIG. 4
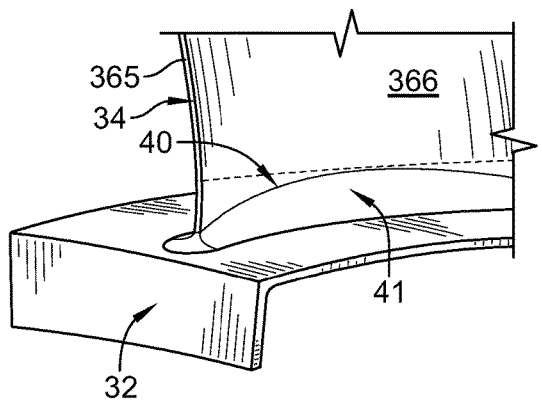
FIG. 5
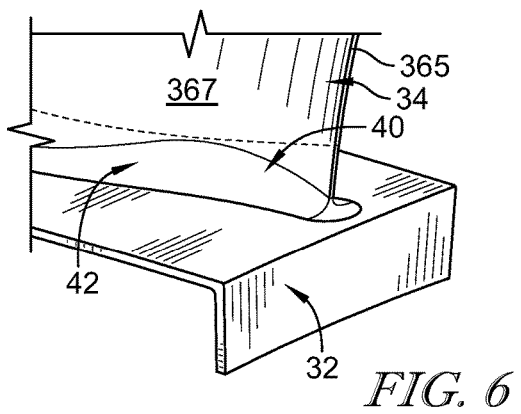
FIG. 6

AIRFOIL WITH STRESS-REDUCING FILLET ADAPTED FOR USE IN A GAS TURBINE ENGINE

FIELD OF THE DISCLOSURE

The present disclosure relates generally to airfoils, and more specifically to airfoils used in gas turbine engines.

BACKGROUND

Gas turbine engines are used to power aircraft, watercraft, power generators, and the like. Airfoils within gas turbine engines interact with gasses moving through the engine to redirect, compress, and/or remove work from the gasses. These interactions apply stresses to the airfoils. Accordingly, airfoil design faces a number of challenges based on these expected stresses.

SUMMARY

The present disclosure may comprise one or more of the following features and combinations thereof.

According to an aspect of the present disclosure, a vane assembly for a gas turbine engine may include an inner band arranged around at least a portion of a central axis, and a plurality of airfoils that extend radially outward from the inner band away from the central axis.

In some embodiments, the vane assembly may be incorporated into a gas turbine engine as part of an outer guide vane included in a fan assembly. In such embodiments, the vane assembly may redirect air discharged by a fan rotor as it moves around an engine core without entering the engine core.

In some embodiments, the pressure side and/or the suction side of the airfoil may be shaped to form a fillet at the interface of the airfoil with the inner band. The fillet may be shaped to taper such that the fillet increases in size as the fillet extends from the trailing edge along a chord length of the airfoil toward the leading edge.

In some embodiments, the fillet(s) may have a first radial height at the trailing edge and a second radial height, greater than the first radial height, spaced along the chord length of the airfoil from the trailing edge. The fillet(s) may have a first endwall width at the trailing edge and a second endwall width, smaller than the first endwall width, spaced along the chord length of the airfoil from the trailing edge. The second radial height and the second endwall width may be spaced from the leading edge of the airfoil.

In some embodiments, the airfoil may be swept such that an axis defined by the airfoil forms an acute angle with the central axis aft of the airfoil.

According to another aspect of the present disclosure, an airfoil for a gas turbine engine may include a body that extends from a root to a tip, the body defining a leading edge, a trailing edge, a pressure side, and a suction side. The pressure side and/or the suction side of the airfoil may be shaped to form a fillet at the root and/or the tip of the airfoil.

In some embodiments, the fillet may be shaped to taper such that the fillet increases in size as the fillet extends from one of the leading edge and the trailing edge along a chord length of the airfoil.

In some embodiments, the fillet(s) may have has a first radial height at one of leading edge and the trailing edge and a second radial height, greater than the first radial height, spaced along the chord length of the airfoil between the leading edge and the trailing edge. The fillet(s) may have a first endwall width defined at one of the leading edge and the trailing edge and a second endwall width, smaller than the first endwall width, spaced along the chord length of the airfoil between the leading edge and the trailing edge.

These and other features of the present disclosure will become more apparent from the following description of the illustrative embodiments.

BRIEF DESCRIPTION OF THE DRAWINGS

FIG. 3 is a perspective view of a portion of the outer guide vane assembly included in the fan assembly of FIGS. 1 and 2 showing that the outer guide vane assembly includes an inner band and a plurality of individual airfoils, sometimes called vanes;

FIG. 4 is a detailed perspective view of a portion of FIG. 3 showing that each airfoil included in the outer guide vane assembly is formed to define a fillet, sometimes called a hub fillet, at its root where the airfoil interfaces with the inner band;

FIG. 5 is a detailed perspective view of a portion of the outer guide vane assembly showing a pressure side of an airfoil extending from the inner band and showing that a pressure-side fillet formed by the airfoil is shaped to taper such that the fillet increases in size as the fillet extends from the trailing edge along a chord length of the airfoil toward the leading edge;

FIG. 6 is a detailed perspective view of a portion of the outer guide vane assembly showing a suction side of an airfoil extending from the inner band and showing that a suction-side fillet formed by the airfoil is shaped to taper such that the fillet increases in size as the fillet extends from the trailing edge along a chord length of the airfoil toward the leading edge.

DETAILED DESCRIPTION OF THE DRAWINGS

Figure 1:
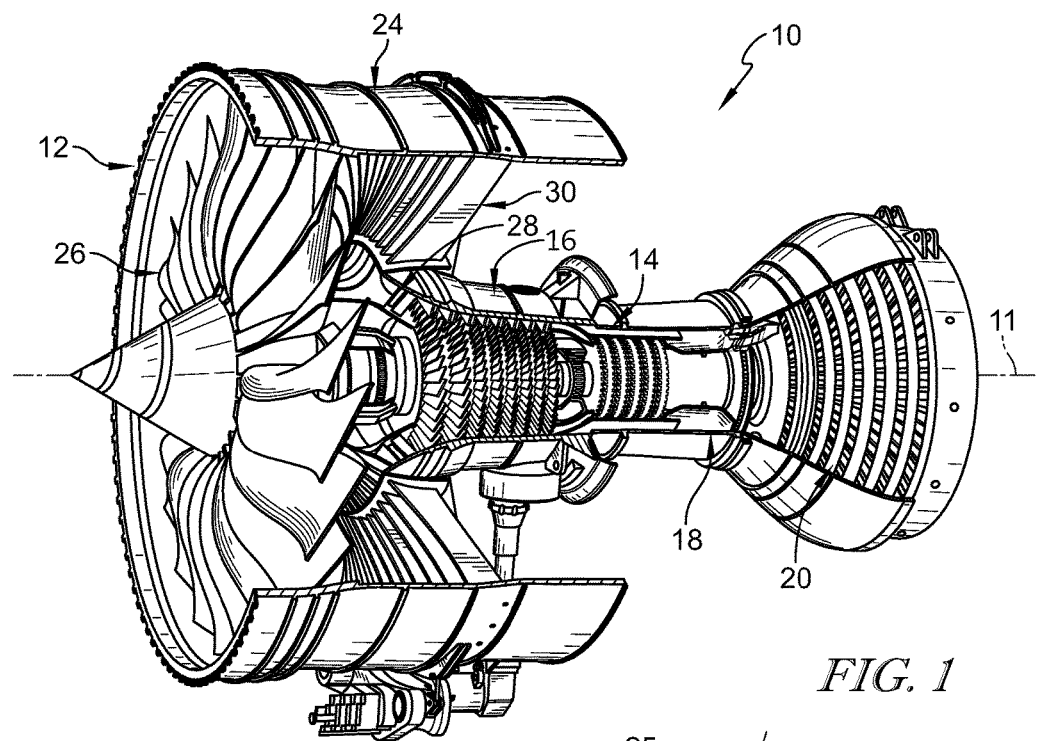
FIG. 1 is a cut away cross-sectional view of a gas turbine engine having a fan assembly coupled to an engine core configured to drive the fan assembly.

For the purposes of promoting an understanding of the principles of the disclosure, reference will now be made to a number of illustrative embodiments illustrated in the drawings and specific language will be used to describe the same.

An illustrative turbo fan gas turbine engine 10 includes a fan assembly 12 coupled to an engine core 14 as shown in FIG. 1. The engine core 14 is coupled to the fan assembly 12 to drive the fan assembly 12 so that the fan assembly 12 provides thrust for an air vehicle.

Figure 2:
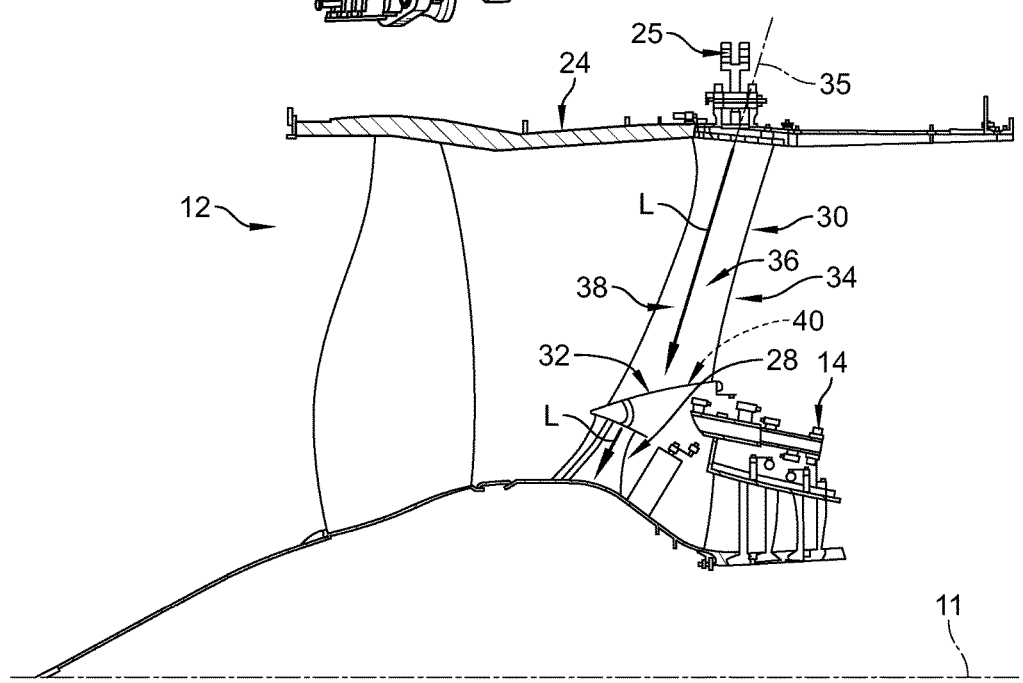
FIG. 2 is a partial cross-sectional view of the gas turbine engine of FIG. 1 showing that the fan assembly includes a fan case adapted to be fixed to an airframe, a fan rotor mounted in the fan case to discharge air axially along a central axis of the engine, an inner guide vane assembly arranged to interact with air discharged from the fan rotor into the engine core, and an outer guide vane assembly arranged to interact with air discharged from the fan rotor around the engine core.

The fan assembly 12 includes a fan case 24, a fan rotor 26, an inner guide vane assembly 28, and an outer guide vane assembly 30 as shown in FIG. 2. The fan case 24 is adapted to be fixed to an airframe via an engine mount 25. The fan rotor 26 is mounted in the fan case 24 to discharge air axially along a central axis 11 of the engine 10. The inner guide vane assembly 28 is arranged aft of the fan rotor 26 to interact with air discharged from the fan rotor 26 moving into the engine core 14. The outer guide vane assembly 30 is arranged to interact with air discharged from the fan rotor 26 moving around the engine core 14.

The outer guide vane assembly 30 included in the fan assembly 12 includes an inner band 32 and a plurality of individual airfoils 34 as shown in FIGS. 2 and 3. The inner band 32, sometimes called an inner ring or splitter, extends around the central axis 11 of the engine 10 and divides fan discharge air moving into or around the engine core 14. The airfoils 34 are coupled to and extend outward in a radial direction from the inner band 32.

The airfoils 34 each include a body 36 that extends from a root 361 to a tip 362 as shown in FIG. 3. The body 36 defines a leading edge 364, a trailing edge 365, a pressure side 366, and a suction side 367 of the airfoil 34. The body 36 is illustratively formed from a sheet of material 38 that is folded to define the leading edge 364, the trailing edge 365, the pressure side 366, and the suction side 367 of the airfoil 34. The sheet of material 38 is illustratively a metallic sheet welded opposite the leading edge 364 of the airfoil 34 to define a weld line along the trailing edge 365 of the airfoil 34.

In some embodiments, the body 36 may be formed from another suitable hollow or solid material (i.e. metallic, polymer, composite, etc.). In some embodiments, the airfoil 34 may be welded to a stub on the inner band along the chord of the airfoil 34 as suggested by the phantom line shown.

Each airfoil 34 included in the outer guide vane assembly 30 is formed to define a fillet 40, sometimes called a hub fillet, adapted to reduce stress in the airfoil 34 during use in the engine 10 as suggested in FIGS. 3-6. The fillet 40 is illustratively located at the airfoil 34 interface of the airfoil 34 with the inner band 32 as shown in FIGS. 3-6.

The exemplary fillet 40 extends around the entire root 361 of the body 36 at the interface of the airfoil 34 with the inner band 32 as suggested in FIGS. 3-6. The fillet 40 includes a pressure-side fillet 41 and a suction side fillet 42 both formed by the airfoil 34 as shown in FIGS. 5 and 6. The pressure-side fillet 41 is shaped to taper such that the fillet 41 increases in size as the fillet 41 extends from the trailing edge 365 along a chord length of the airfoil 34 toward the leading edge 34. Similarly, the suction-side fillet 42 is shaped to taper such that the fillet 42 increases in size as the fillet 42 extends from the trailing edge 365 along a chord length of the airfoil 364 toward the leading edge 364.

In the specific embodiment shown, the fillets 41, 42 have a first radial height at the trailing edge 365 and a second radial height, greater than the first radial height, spaced along the chord length of the airfoil 34 from the trailing edge 365 as shown in FIGS. 5 and 6. In addition, the fillets have a first endwall width at the trailing edge 365 and a second endwall width, smaller than the first endwall width, spaced along the chord length of the airfoil 34 from the trailing edge 365 as shown in FIGS. 5 and 6. Both the second radial height and the second endwall width are spaced from the leading edge 364 of the airfoil 34.

Figure 7:
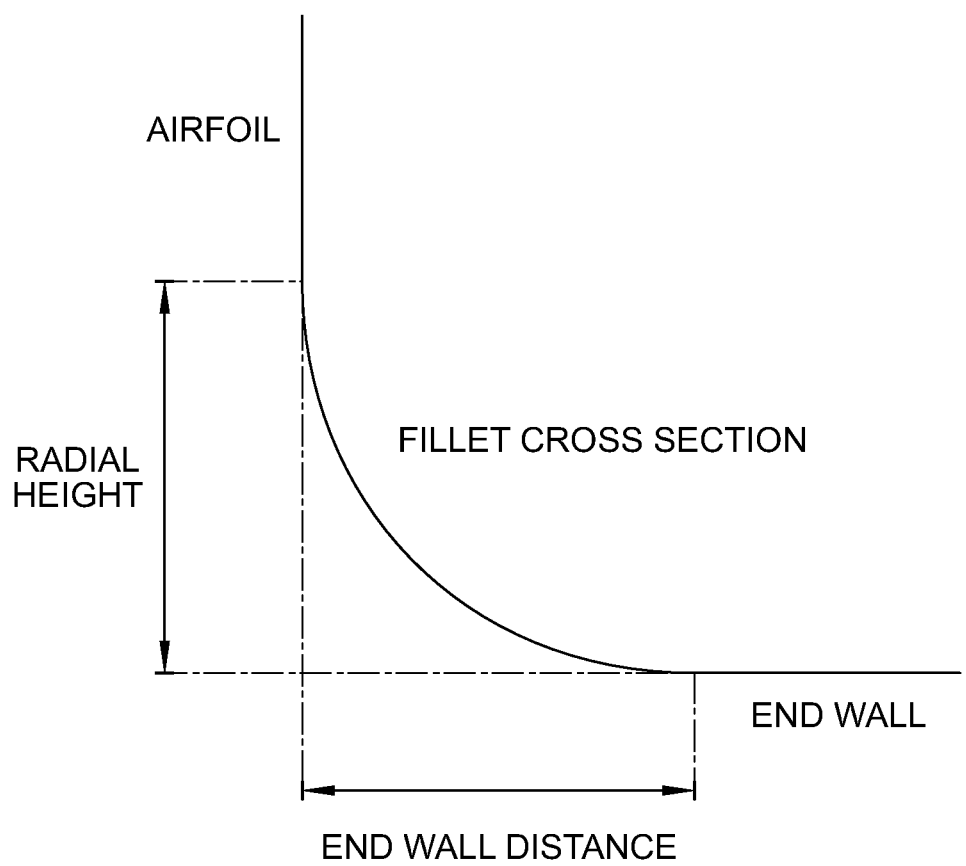
FIG. 7 is a diagrammatic cross-sectional view of a portion of the hub fillet shown in FIGS. 3-6 showing nomenclature associated with fillet shape and size.

Illustrative radial height and endwall width dimensions are shown in the diagrammatic cross-section of fillets 41, 42 in FIG. 7. The radial height of the fillets 41, 42 is measured radially outward from the central axis 11 along the axis 35 of a corresponding airfoil 34 as suggested in FIG. 7. The endwall width of the fillets 41, 42 is measured from a nominal side of the airfoil 34 radially outward of the fillet 41, 42 along the inner band 32 as suggested in FIG. 7.

In the illustrative embodiment, the airfoils 34 are swept or angled such that an airfoil axis 35 defined by each airfoil 34 forms an acute angle with the central axis 11 of the engine 10 aft of the airfoil 34 as shown in FIG. 2.

The engine core 14 illustratively includes a compressor assembly 16, a combustor assembly 18, and a turbine assembly 20. The compressor assembly 16 and the turbine assembly 20 both include rotating airfoils (blades) and static airfoils (vanes). The principles of the present disclosure as applied specifically to airfoils 34 included in fan assembly 12 may also be applied to airfoils included in the compressor assembly 16 and the turbine assembly 20.

Features of the present disclosure are designed to reduce peak stresses of airfoil roots with the disclosed fillet 40 design. These features may be helpful in designs that incorporate welded airfoils 34, but may still be applicable to those that don't. Features of the present disclosure derive from having to balance fillet and weld stresses.

Load carrying structural outer guide vanes 34, sometimes called outlet guide vanes (OGV's), de-swirl fan bypass air while also carrying engine loading for the front end of the engine 10. The vanes 34 are initially defined to meet both noise and aerodynamic requirements and then detailed to provide the structural shape to carry whole engine loads (Fan Blade Off, Fatigue, etc). An OGV assembly 30 can be seen in FIG. 2. In the figure, the arrows L represent the load path through the vanes 34 themselves to the surrounding static structure.

The loading imparted into the OGV structure 30 can create a localized stress at the outermost attachment points of the vanes 34 where they transition to the hub/inner band 32 and tip 362. The present disclosure provides a modification to the method in which the airfoil 34 transitions into the hub/inner band 32 of the vane structure 30. In particular, the swept OGV design 30 may sometimes result in a stress concentration at the hub of the trailing edge 365.

With a constant fillet radius design, there can be too sharp of a transition from the airfoil 34 to the hub structure 32 to sufficiently distribute the stress. This can result in a stress concentration for both the steady load carrying stresses and alternating stresses due to blade vibrations which compound to make a life limited design. The weld typically consists of significantly reduced properties therefore, even with a favorable decrease in stress at the fillet, a slight increase in stress at the weld will negate the effect. Features of the disclosed design can balance this effect.

The presently disclosed fillet 40 has counter intuitive fillet shape. Most fillet designs focus on reducing the fillet stress by increasing their size incorporating a compound nature. These designs can push stresses to other regions. This design does the opposite as it shrinks the fillet size and provides an anchoring effect as the primary load path.

Aspects of the present disclosure include that the fillet 40 has a low radial height with large endwall width (or endwall distance) at the edge, transitioning to a large radial height with a low end wall width (or endwall distance) between a specific percentage of chord forward/aft of the edge with the stress concentration .

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an engine core including a compressor assembly, a combustor assembly, and a turbine assembly,
a fan assembly including a fan rotor coupled to the engine core to be driven by the engine core, an inner guide vane assembly arranged to interact with air discharged by the fan rotor moving into the engine core, and an outer guide vane assembly arranged to interact with air discharged by the fan rotor moving around the engine core,
wherein the outer guide vane assembly includes an inner band arranged around at least a portion of a central axis and an airfoil that extends radially outward from the inner band away from the central axis, the airfoil including a sheet of material that is folded to define a leading edge of the airfoil, a pressure side of the airfoil, and a suction side of the airfoil, the sheet of material being welded along a trailing edge of the airfoil to define the trailing edge, and
wherein at least one of the pressure side and the suction side of the airfoil is shaped to form a fillet at the interface of the airfoil with the inner band, the fillet shaped to taper such that the fillet increases in height measured radially from the inner band as the fillet extends from the trailing edge along a length of the airfoil toward the leading edge of the airfoil, and
wherein the fillet has a first radial height from the inner band at the trailing edge, a second radial height from the inner band, greater than the first radial height, spaced along the length of the airfoil from the trailing edge axially between the trailing edge and an axially-located midpoint of the airfoil between the leading edge and the trailing edge, and a third radial height from the inner band at the axially-located midpoint less than the second radial height.

2. The engine of claim 1, wherein both the pressure side and the suction side of the airfoil are shaped to form a fillet at the interface of the airfoil with the inner band.

3. The assembly of claim 1, wherein the fillet has a first endwall width measured from the airfoil along the inner band at the trailing edge and a second endwall width measured from the airfoil along the inner band, smaller than the first endwall width, spaced along the length of the airfoil from the trailing edge.

4. The assembly of claim 1, wherein the airfoil is swept such that an axis defined by a radial length of the airfoil forms an acute angle with the central axis aft of the airfoil.

* * * * *